(12) United States Patent
Kant et al.

(10) Patent No.: US 9,380,486 B2
(45) Date of Patent: Jun. 28, 2016

(54) METHOD AND SYSTEM FOR SIGNALING REDUCTION ON RADIO ACCESS NETWORKS USING TARGETED INTELLIGENCE FOR COMMUNICATION DEVICES

(71) Applicants: Nishi Kant, Fremont, CA (US); Heeseon Lim, Cupertino, CA (US)

(72) Inventors: Nishi Kant, Fremont, CA (US); Heeseon Lim, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 13/763,372

(22) Filed: Feb. 8, 2013

(65) Prior Publication Data

US 2015/0327112 A1 Nov. 12, 2015

Related U.S. Application Data

(60) Provisional application No. 61/596,613, filed on Feb. 8, 2012.

(51) Int. Cl.
*H04W 28/02* (2009.01)
*H04W 68/02* (2009.01)

(52) U.S. Cl.
CPC ...... *H04W 28/0263* (2013.01); *H04W 28/0215* (2013.01); *H04W 28/0226* (2013.01); *H04W 68/02* (2013.01)

(58) Field of Classification Search
None
See application file for complete search history.

(56) References Cited

U.S. PATENT DOCUMENTS

| | | | | |
|---|---|---|---|---|
| 2004/0213181 | A1* | 10/2004 | Grech et al. | 370/331 |
| 2007/0014281 | A1* | 1/2007 | Kant | 370/352 |
| 2011/0263274 | A1* | 10/2011 | Fox et al. | 455/456.2 |
| 2013/0136072 | A1* | 5/2013 | Bachmann et al. | 370/329 |
| 2014/0194111 | A1* | 7/2014 | Aso et al. | 455/419 |
| 2015/0327112 | A1* | 11/2015 | Kant et al. | 370/312 |

* cited by examiner

*Primary Examiner* — Benjamin H Elliott, IV
(74) *Attorney, Agent, or Firm* — Blank Rome, LLP

(57) ABSTRACT

An intelligent system and an algorithm at a packet network to reduce the amount of signaling in the radio access network and core network is defined. The system collects all the necessary information from the signaling exchange between the radio access network and the core network and takes the subscription characteristics and policy information into consideration to choose the optimal way of reducing the amount of signaling including selecting the optimal bearers for certain types of communications and paging selected area instead of the whole area for each device. The bearer selection algorithm takes several things as input to choose the optimal bearer to perform the task.

15 Claims, 5 Drawing Sheets

METHOD AND SYSTEM FOR SIGNALING REDUCTION ON RADIO ACCESS NETWORKS USING TARGETED INTELLIGENCE FOR COMMUNICATION DEVICES

METHOD AND SYSTEM FOR SIGNALING REDUCTION ON RADIO ACCESS NETWORKS USING TARGETED INTELLIGENCE FOR COMMUNICATION DEVICES

CROSS REFERENCE TO RELATED APPLICATIONS

The present application claims the benefit of U.S. Provisional Application No. 61/596,613, filed on Feb. 8, 2012 by the present inventors, which is herein incorporated by reference.

FIELD OF THE INVENTION

The present invention relates generally to general packet radio service (GPRS) networks. More particularly, this invention relates to a method for reducing the signaling load on the radio access network for machine to machine type communications which has different characteristics from that of human communications through intelligent processing of information for targeted device.

BACKGROUND

The GPRS or universal mobile telecommunications system (UMTS) is an evolution of the global system for mobile communications (GSM) standard to provide packet switched data services to GSM mobile stations. Packet-switched data services are used for transmitting chunks of data or for data transfers of an intermittent or bursty nature. Typical applications for 3GPP packet service include Internet browsing, wireless e-mail, video streaming, and credit card processing, etc. used by human users.

Organizations both private & government that are Local & Global are looking for new and innovative ways to manage their business & operations at an optimum cost structure. As the cost of connectivity starts to drop precipitously, they are looking to take advantage of huge efficiency gains through access to data for processing and analysis in an optimized way, which previously was only available through costly human intervention.

These new applications and markets start to emerge that take advantage of ubiquitous cellular coverage. Even though the underlying radio technology continues to evolve from 2, 2.5, 3G and now LTE, new innovation is being developed to take advantage of this infrastructure in the form of smart devices and sensors that are creating new market opportunities for Mobile Network Operators (MNO's). Cellular networks are ideal in connecting millions of data collecting devices to the processing infrastructure. The opportunity to connect millions and even billions of devices is creating an exciting market opportunity commonly defined as M2M.

However, as MNO's look to seize this new market opportunity, there are many challenges in adopting the same practices and architecture that were designed for a very different human consumer market model. The cost structure is fundamentally different, the relationship with the Enterprise is fundamentally different and the impact on the network from non-human devices is fundamentally different.

Most machine to machine offerings currently in the market treat the cellular network as a transport pipe. While this approach is simple and can be deployed using existing cellular infrastructure, it ignores the fact that machine type communication needs are inherently different than those for a human subscriber. Furthermore, lots of machine type communication is more signaling intensive than data intensive; i.e. the amount of data that is communicated between the device and the network is often times very small and there are many signaling exchanges to establish the data channel between the device and the network. Furthermore, a number of MTC devices can be a lot bigger than that of single user subscribers, e.g. a smart meter deployed in a county could be millions. As the number of connected devices goes up, the network would succumb to signaling overload and possible other forms of congestion, especially in the radio network.

FIG. 1 is a block diagram illustrating signaling overhead of typical machine to machine type communications over GPRS network architecture. Referring to FIG. 1, machine type devices 101 are communicatively coupled to a UMTS mobile network 110. For example, machine type device 101 is coupled to the mobile network 110 via a 3G Radio access network through e.g. nodeB or NB and radio network controller (RNC) 102, a serving GPRS support node (SGSN) for 3G network or serving gateway (S-GW) for LTE network 103 and a gateway GPRS support node (GGSN) for 3G network or packet data network (PDN-GW) 104 for LTE network. In order for the MTC device 101 to communicate to a MTC application server 106 located in other networks such as Internet and/or Enterprise premise, machine type devices 101 go through UMTS mobile network 110, which relay communications between a machine type UE 101 and a destination (e.g. Enterprise server 106).

For the UE to establish relationship with the network, there are lots of signaling messages exchanged between the UE and the network. For MTC services, most of the communications are initiated by the MTC application server 106 which sends the command to the MTC devices 101. In order to save the radio and core network resources and to save the battery usage of the devices, the UMTS mobile network puts the device into "idle" mode. When a device enters idle mode, it removes all the radio associations and frees up that radio resource and only listens to a common broadcasting channel for paging. Based on a statistics of machine to machine communications, there will be billions of connected devices in a few years and this will result in significant increase in amount of signaling due to paging.

When a MTC application server 106 sends has a command to send to a device 101, the UMTS mobile network 110 first needs to establish the signaling and bearer connection before it can send anything from the network. This process starts by the application server 106 sends the multiple commands for multiple devices 111 to the GGSN or P-GW 104. The GGSN or P-GW 104 sends multiple commands for multiple devices 112 to the SGSN or S-GW/MME 103 to wake up one or more devices from the idle mode. The SGSN or MME 103 sends multiple queries 113 to the HSS 105 to check the status and the location of the devices. Then the SGSN or MME 103 sends multiple paging messages 114 to the RNCs 102 for the devices. When the device is in idle mode, the network does not know which RNC 102 the device is located at, so the SGSN 103 has to send the paging message to all the RNCs 102 in the same routing area. This means if there are three RNCs 102 in one routing area, SGSN 103 sends three paging request messages (one for each RNC) for each device. If the command was for thousand devices in certain routing area, this means there will be 3000 paging requests over the air. Radio spectrum is an expensive and rare resource for the mobile operators and supporting the MTC devices could put lots of burden on the radio resources especially as the number of MTC devices grow exponentially, to millions and billions.

SUMMARY OF THE DESCRIPTION

An intelligent system and an algorithm at a core network to reduce the amount of signaling in the radio access network and core network is defined. The system collects all the necessary information from the signaling exchange between the radio access network and the core network and takes the subscription characteristics and policy information into consideration to choose the optimal way of reducing the amount of signaling including selecting the optimal bearers for certain types of communications and paging selected area instead of the whole area for each device.

The bearer selection algorithm takes several things as input to choose the optimal bearer to perform the task. The possible bearers could be SMS, data bearer (through PDP context), USSD, or MBMS depending on the type and capability of the devices. Particularly, the invented system uses the ID management capability of previous invention to use SMS as one of the bearers without burdening the operators with excessive use of MSISDN (phone number that is allocated to each device). MSISDN is a mandatory parameter for SMS procedure and the ID management capability allows a group of devices to share one MSISDN and helps operators from assigning MSISDNs to non-voice connected devices.

This type of signaling reduction can happen at each network node or even further consolidated into one network node. This invention supports both modes. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiment, a mechanism is provided to reduce the signaling load both in the core network and the radio access network thus saving expensive radio resources as well as saving the processing resources at the core network. In one embodiment, a virtual optimized core (VOC) is configured to handle all the procedures to support mobility/session management, authentication/authorization, and data processing for the machine type devices as one logical core network node. The VOC includes the control plane and user plane processing functionalities and the subscription data/policy data storage functionalities to support the aforementioned procedures.

Figure 2:
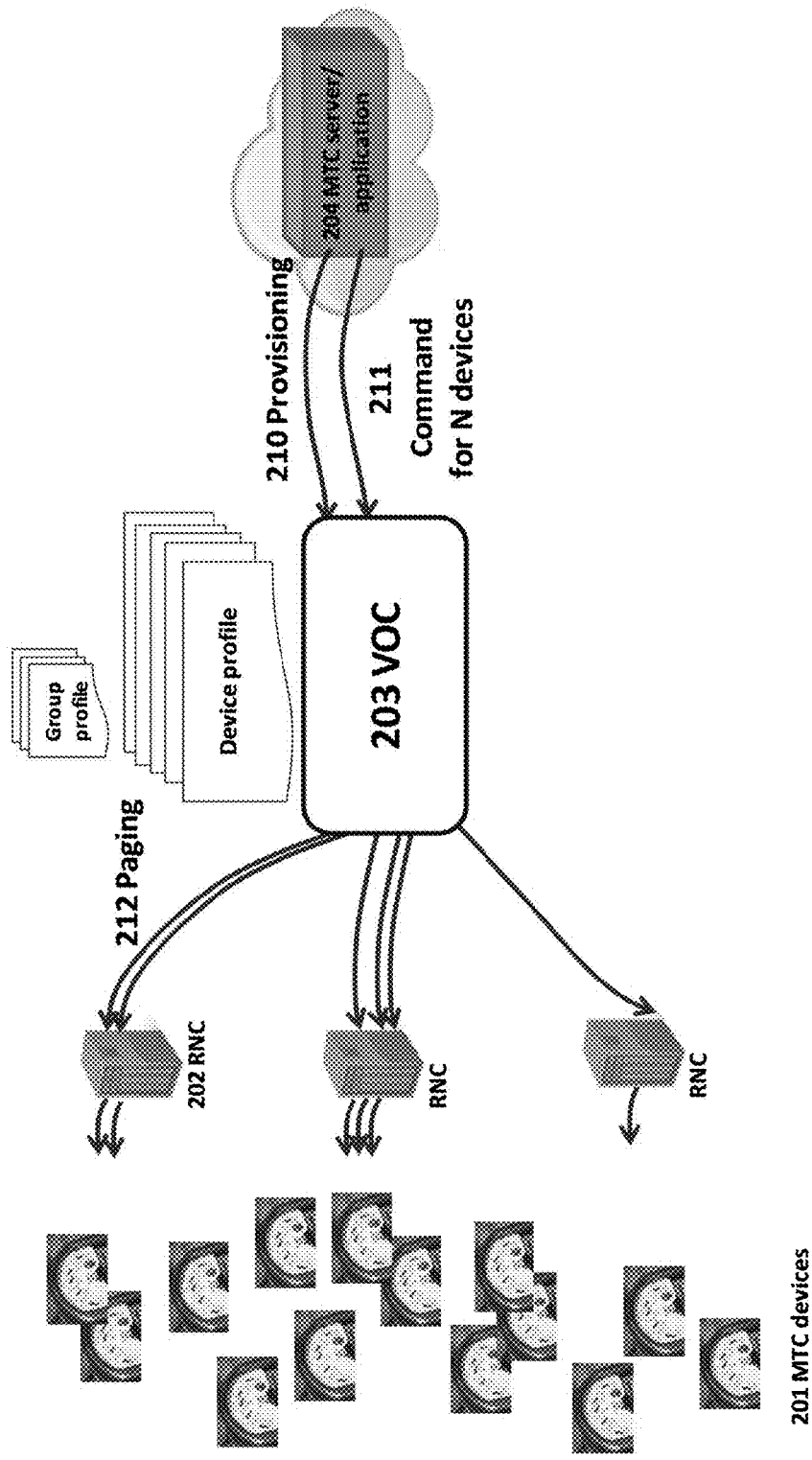
FIG. 2 is a block diagram illustrating system according to one embodiment.

FIG. 2 is a block diagram illustrating a network configuration according to one embodiment of the invention. Referring to FIG. 2, user equipments for machine type communications (MTC UEs) 201, shown here as utility sensor, are communicatively coupled to a virtual optimized core (VOC 203) having collapsed core network functionality with intelligent signaling reduction algorithm, to communicate with machine type communication servers and applications (MTC servers 204). For example, MTC UE 201 is coupled to the VOC 203 via a corresponding 3G radio access network (3G RAN) 202. MTC UE 201 can be also coupled to the VOC 203 via other types of radio access network, for example, long term evolution (LTE) access network or Wi-Fi access network.

As VOC 203 is self-contained core network realization containing all the core network functionalities including SGSN/S-GW/MME, GGSN/P-GW, HLR/HSS, and PCRF, it can communicate to a MTC UE 201 via various access networks by simply supporting interfaces towards the access networks, without the need for total core network upgrade or update. For example, when a mobile carrier upgrades the network from 3G to LTE, VOC can support the upgrade by supporting S1 interface from eNB on top of Iu-ps interface from RNC, while all the rest of functionalities remain the same thus removing the need for extensive upgrade for mobile carriers.

In one embodiment, the VOC 203 includes, among others, interface towards radio access network 202, interface towards MTC servers/applications 204, internal device profile in group and individual level, and an internal algorithm for selecting the optimized paging mechanism for the MTC devices 201. Interface towards radio access network is designed to support various access networks by providing standard interfaces towards each access network, including 3G, 4G (LTE), or Wi-Fi. Interface towards MTC application is designed to provide communications towards the server at the enterprise and/or packet data network through an optimized API (application protocol interface). Internal device profile includes all the profile information of the device including subscription/mobility/session information, at the group and individual device level. Internal algorithm is designed to select the optimal bearer to send the command and data between the MTC devices and the MTC server/application and to use the information that is available to the VOC to decide the cells/RNCs to send the paging request to.

The internal algorithm is used to reduce the signaling load between the MTC devices and the MTC servers. The algorithm uses several information to choose the best bearer for this communication and to choose the RAN area to send the paging requests. Internal algorithm uses the information such as: length of the command (i.e. number of bytes), frequency of the command (e.g. time period each data needs to be read), device's mobility state (idle or connected), device's PDP context state (inactive or active), location, time of the day, etc. for this purpose. Based on the information, internal algorithm makes a decision how and where to send the command. For example, if MTC server had sent the command to read the data from vending machine every 24 hour from all the machines in certain area, with the data size of 10 kbytes, internal algorithm can decide to use data bearer to read the data from the machines; hence establishing PDP context every 24 hour and then delete the context after it reads the data. If, as another example, the server needs to read the data from the smart meters every 15 minutes with the data size of 100 byte, then the internal algorithm may choose to use SMS for transferring the data instead of PDP context. Yet another example could be fitness sensors that need to send the data of size 50 byte such as heartbeat rate, temperature, calories burnt, etc. every 1 minute during the period of exercise (e.g. 1 hour in a day). In this case, internal algorithm may decide to establish data bearer through PDP context activation and keep the bearer for an hour, at which point the PDP context may be deactivated. As described here, internal algorithm would control the communications mechanism between the MTC devices and the MTC servers to minimize the overall signaling load on the network while maximizing the resource utilization.

Figure 1:
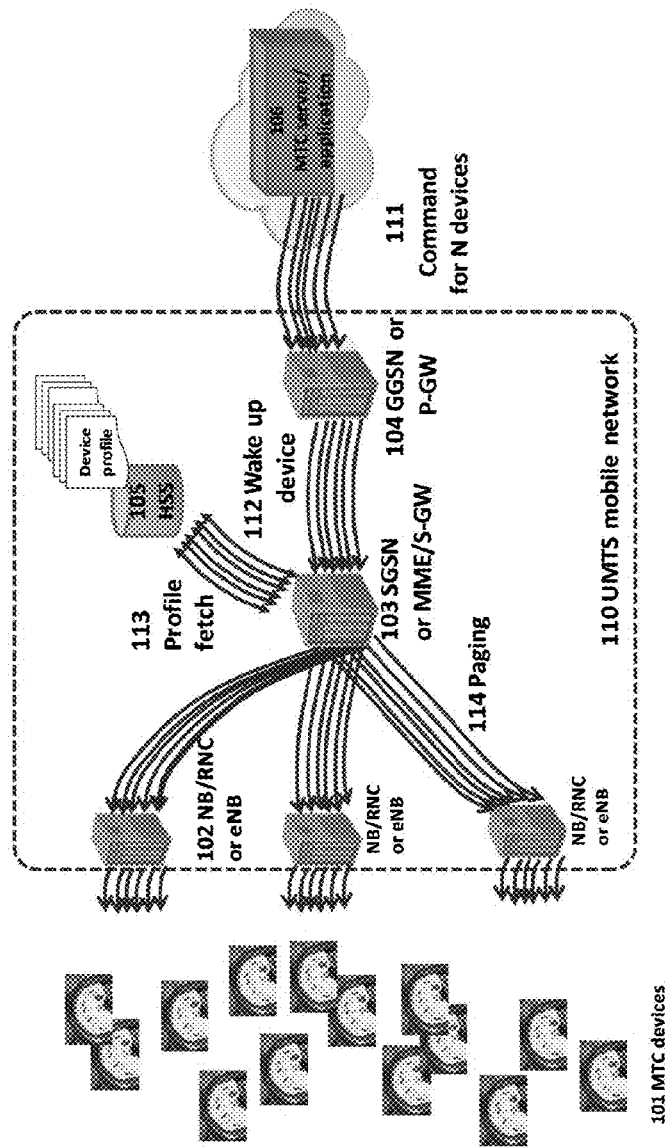
FIG. 1 is a block diagram illustrating machine type communications over typical 3GPP packet core and the signaling exchanges when an application sends a command for the MTC devices.

When the device is in idle mode, paging is needed from the VOC for both PDP context activation and SMS delivery. Internal algorithm also makes an intelligent decision to minimize the signaling caused by the paging. As shown in FIG. 1, many number of devices cause enormous amount of signaling due to paging. VOC's internal algorithm reduces this signaling load caused by paging to the ratio of 1:N, depending on how many RNCs each SGSN supports, where N is the number of RNCs each SGSN supports.

When the MTC servers 204 provision 210 a group of devices, the VOC can put this information into its profile database in a hierarchical manner with group and individual level. At any point after the provisioning, when the MTC servers 204 have command to send for one or more devices, it sends the command 211 for the devices to the VOC 203. When VOC 203 receives the command (e.g. read the meters every 15 minutes until there is another command to cancel this request, or send the streaming video from a company's security camera between the hour 2000 and 2400.), it analyzes the command and decides the type of bearer, then stores this decision into the profile together with the trigger timer. If VOC 203 has to establish PDP contexts or send the SMS according to the decision, and the devices' state is idle, VOC 203 uses the location information in the profile (if the device is stationary) or uses its intelligent location follow-on algorithm (if the device is mobile) to decide the RNC where the device is located. With this information, VOC can send the paging request 212 for each device to only the RNC the device is located, compared to traditional core network which sends the paging request for each device to all the RNCs connected to that SGSN.

Figure 3:
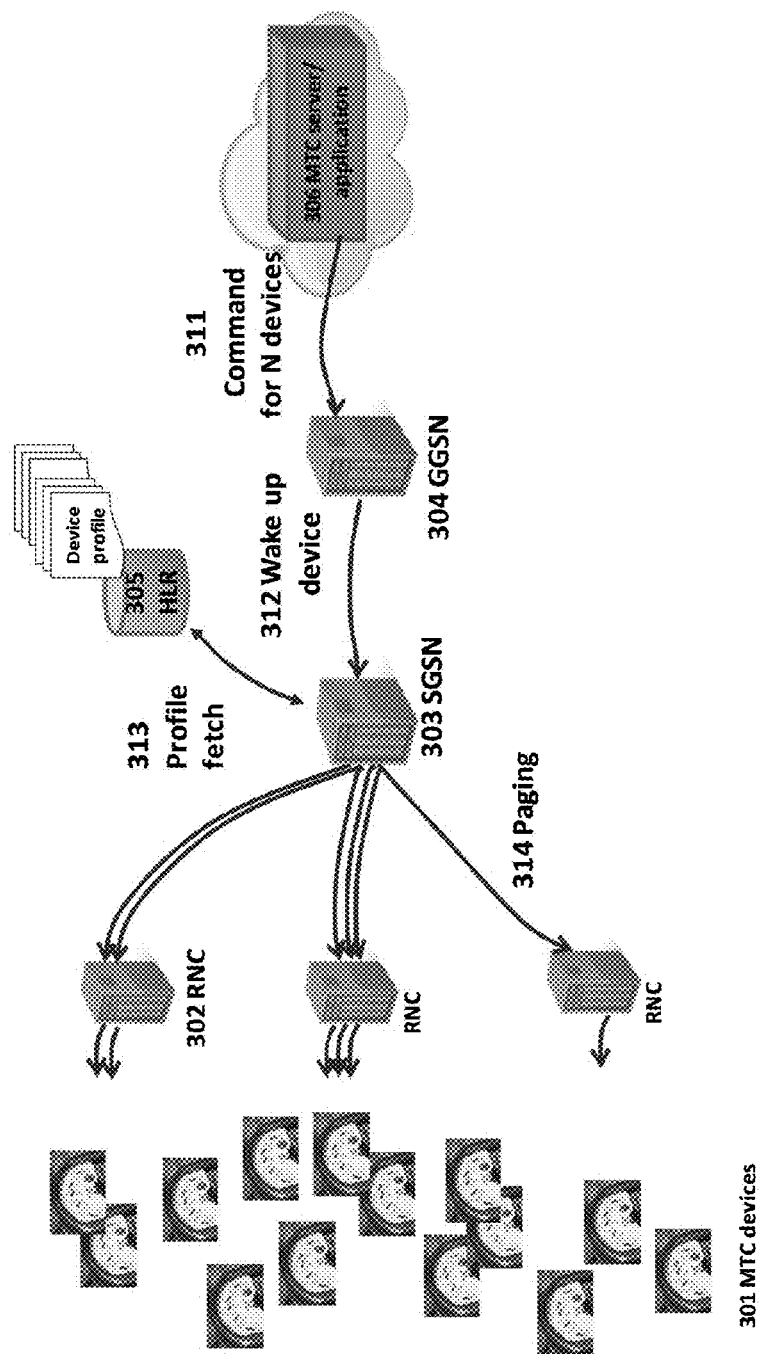
FIG. 3 is a block diagram illustrating a 3GPP packet system according to another embodiment.

FIG. 3 is a block diagram illustrating a network configuration according to another embodiment of the invention. Similar to configuration 200 of FIG. 2, configuration 300 of FIG. 3 includes the intelligent algorithm to decide the type of the bearers and the RNC to send the paging request to. In one embodiment, the HLR 305 stores the device profile which includes part of information to be used in making a decision. The SGSN 303 and GGSN 304 are enhanced to include the internal algorithm described in paragraphs [0026], [0027], and [0028]. The GGSN 304 is enhanced to include the bearer selection algorithm based on session information and the nature of command sent from the MTC servers 306. The SGSN 303 is enhanced to include the bearer selection algorithm based on the mobility, session, and subscription information, and the paging area RNC selection algorithm based on the location information. Both SGSN 303 and GGSN 304 are needed to perform this function because only GGSN 304 has the interaction with the MTC servers 306; hence has the ability to analyze the nature of command while only SGSN 303 has the subscription and mobility information of each device.

When the MTC servers 306 have command to send for one or more devices, it sends the command 311 for the devices to the GGSN 304. When GGSN 304 receives the command (e.g. read the meters every 15 minutes until there is another command to cancel this request, or send the streaming video from a company's security camera between the hour 2000 and 2400.), it analyzes the command and decides the type of bearer, then stores this decision internally with the trigger timer. If network needs to establish PDP contexts or send the SMS according to the decision, the GGSN 304 sends the request to SGSN 303 to initiate the communication. SGSN 303 checks the device's mobility state and if the device's state is idle, SGSN 303 also fetches the subscription information from the HLR 305 and uses the subscription information and other information in the profile (if the device is stationary) or uses its intelligent location follow-on algorithm (if the device is mobile) to decide the RNC the device is located. With this information, SGSN 303 can send the paging request 314 for each device to only the RNC the device is located, compared to traditional core network without enhancement at the SGSN or GGSN which sends the paging request for each device to all the RNCs connected to that SGSN.

Figure 4:
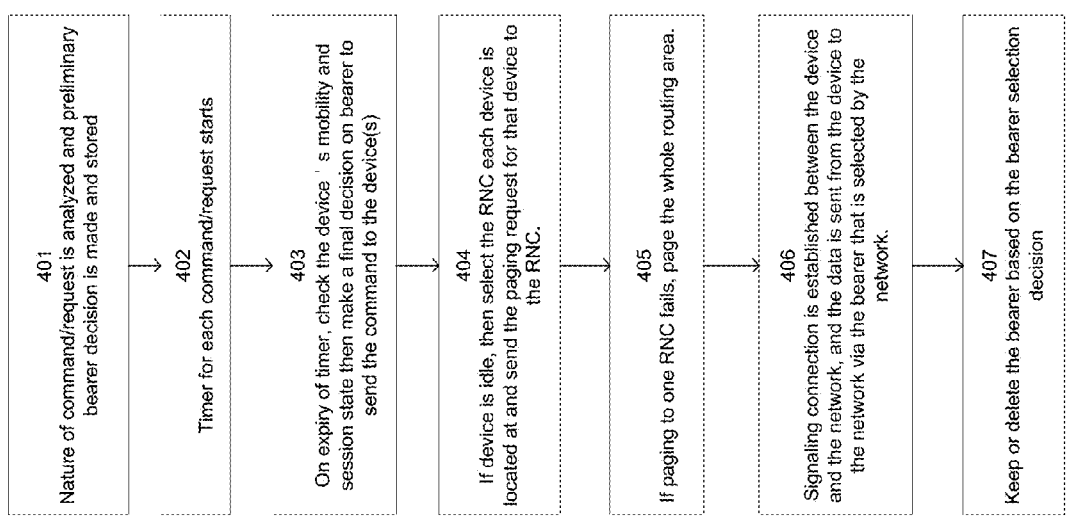
FIG. 4 is a flow diagram illustrating a paging process according to one embodiment of the invention.

FIG. 4 is flow diagram illustrating a method for sending the command from the application/server to a user equipment through UMTS mobile network according to one embodiment of the invention. Note that method 400 may be performed by processing logic which may include software, firmware, hardware, or a combination thereof. For example, method 400 may be performed by VOC 203 of FIG. 2 or SGSN 303/GGSN 304/HLR 305 of FIG. 3. Referring to FIG. 4, at step 401, in response to a command/request from an application/server to read the data from user equipments, the nature of command is analyzed in terms of frequency, data size, duration, QoS, etc. and based on this analysis, preliminary decision of which bearer is the optimal bearer to fulfill this request is made. In one embodiment, if the command is to read from the device every 15 minutes that sends the data size of 100 byte, then the SMS may be selected for transferring the data from the network to the device. If the command is to read the streaming video from a company's security camera between the hour 2000 and 2400, then the PDP context may be selected for this command. This preliminary decision is stored for later use.

At step 402, based on the frequency and the duration of the requests from step 401, a timer for each command/request is defined and started. For example, if the request is to read the smart meter every hour, a timer with the value of one hour is created and started so that the appropriate action per request can be initiated.

At step 403, on expiry of timer, user equipment's mobility and session state is checked. The mobility and session state combined with the preliminary decision information made in step 1, provide a basis to make a final decision according to the configuration and needs. In one embodiment, if user equipment's mobility state is connected and there is an active session with appropriate QoS while the primary bearer selection was SMS, the final decision can be just to use the existing session to perform the request, not via SMS. On the other hand, if the mobility state is connected but there is no active session, and the primary bearer selection was SMS, the final decision can be the same as the preliminary decision and request can be fulfilled via SMS.

If the mobility state is idle, then the logic to select the paging area for the device(s) is performed at step 404. This logic uses the location of the device at the cell and RNC level for a reasonably long period of time to make an intelligent and accurate prediction of the location of the device. If the device is stationary, the logic sees that the device has not moved out of one cell or RNC area for the period of time and selects that RNC as the paging area. If the device is moving, the logic checks the moving trajectory and makes an intelligent prediction based on the moving pattern and selects the appropriate RNC as the paging area. For example, if a device is mounted on a truck that drives along inter-state highway at certain speed, the logic can select the appropriate RNC a device could be at certain time. This is the selected RNC. The paging request for the device is sent to the selected RNC, which sends the paging request to the device via nodeB. This logic reduces the total number of paging requests by only sending one paging request per device per routing area, compared to multiple paging requests per device per routing area. The number of paging requests per device per routing area in traditional network is a function of the number of RNCs in one routing area.

If the paging fails, in other words, if there is no paging response from the device, it means the device may not be in that RNC area. In this case, at step 405, another paging request is sent to all the RNCs in the routing area a device is located at. This ensures that the devices will get the paging request even if the first selected RNC is not the RNC the device located at.

At step 406, device establishes the signaling connection as a response to paging and the procedure to create the bearer is initiated. The network establishes the data bearer that is selected in step 403 and transfers the data to the device.

When the communication is done, the network can decide whether to keep the bearer or delete it. This decision is made based on the nature of command/request and the bearer selection described in step 401. In one embodiment, if the preliminary bearer selection was PDP context between the hour 2000 and 2400, the PDP context can be reserved until the hour 2400. If the preliminary bearer selection was SMS, but the PDP context was used since the PDP context was already active when the command was performed, the PDP context could be deleted if there is no other data communications going on.

Figure 5:
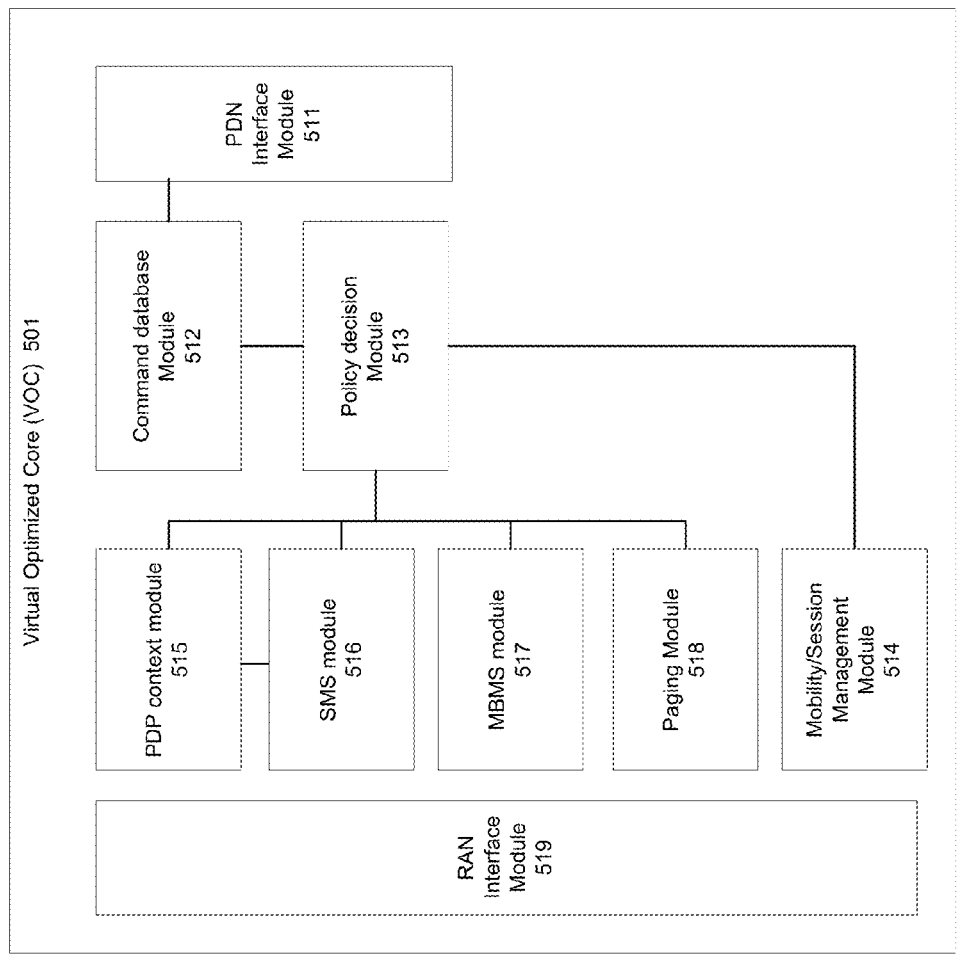
FIG. 5 is a block diagram illustrating a VOC (virtual optimized core) according to one embodiment of the invention.

FIG. 5 is block diagram illustrating the virtual optimized core (VOC) for processing signaling and user data traffic with intelligent logic to reduce the signaling load on the core network and the radio access network by bearer selection mechanism and paging area selection mechanism. Note that system 501 may be performed by processing logic which may include software, firmware, hardware, or a combination thereof. Referring to FIG. 5, at command database module 512, in response to a request from application/server via PDN interface module 511 to send one or more commands to the device, command database module 512 creates a command entry for that device or a group of devices. Then the command database module 512 consults the policy decision module 513 to have a preliminary decision on the bearer selection based on the nature of the commands. Policy decision module 513 takes information stored in command data module 512 as an input and decides which bearer needs to be used to perform the requested command. The policy decision module 513 analyzes the nature of command in terms of frequency, data size, duration, QoS, etc. and based on this analysis, makes a preliminary decision which bearer is the optimal bearer to fulfill this command. Once the policy decision module 513 makes a decision, it stores this decision at the command database module 512. The command database module 512 also starts the timer for each command so that it can actually send the command to the device. For example, if the command was to read the meter every 15 minute, the command database module 512 would start the timer of 15 minutes, and initiate the process to send the command to the device on the timer expiry.

Once any of the command timers expires, the command database module 512 sends the trigger signal to the policy decision module 513 to send the command. Then the command sending procedure is triggered, the policy decision module 513 fetches the preliminary decision of the bearer from the command database module 512 and also fetches the device's mobility and session state from mobility/session management module 514. With the information it gets from the command database module 512 and the mobility/session management module 514, the policy decision module 513 makes the final decision on the bearer via which the command is sent. If the final bearer selection for the command is data connection through PDP context, policy decision module 513 triggers the PDP context module 515 to initiate the PDP context activation procedure. If the final bearer selection is SMS, policy decision module 513 triggers the SMS module 516 to initiate the SMS message delivery procedure. If the final bearer selection is MBMS, policy decision module 513 triggers the MBMS module 517 to initiate the MBMS delivery procedure.

Policy decision module 513 also keeps track of the device's location via interaction with mobility/session management module 514. The mobility/session management module 514 updates the device's location in terms of cell area and RNC area to the policy decision module 513 periodically and the policy decision module 513 keeps track of the location of the device.

If the mobility state of the device provided from the mobility/session management module 514 is idle, the paging is needed and each of the bearer handling module, including PDP context module 515, SMS module 516, or MBMS module 517 would initiate the paging procedure by triggering the paging module 518. When the paging procedure is triggered, the paging module 518 interacts with policy decision module 513 to get the area, in terms of RNC, where the paging request has to be sent. Policy decision module 513 uses the device location information described in step [0040]. In one embodiment, the policy decision module 513 can conclude the device is stationary if the device has been located in the same RNC for some period of time and chooses the same RNC for the paging RNC. In case the device is mobile, the policy decision module 513 can determine the RNC based on the pattern of the mobility of the device and the geographical knowledge of RNC distribution. When a RNC to be paged is selected, the policy decision module 513 sends this information to the paging module 518. The paging module 518 sends the paging request for the device only to that RNC. If the paging fails, i.e. if there is no paging response from the device, it means the device has moved away from the RNC that is selected by the policy decision module 513 and the paging module 518 pages all the RNCs that are connected to the VOC.

Once the paging procedure is completed, the device has the signaling connection to the network and it each bearer handling module, PDP context module 515, SMS module 516, or MBMS module 517 can send the data to the device via its bearer respectively.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method performed within a network element of a packet core for selecting a bearer to transfer data with a user device responsive to a command from a network application to the user device, the method comprising:
   receiving the command from the network application;
   analyzing the command for various criteria, including at least one of frequency, size of data, quality of service, time criticality, mission criticality, and duration;
   making a preliminary selection of the bearer to require minimum overall signaling exchanges with minimum overall packet counts for the data transfer to deliver the command to the user device based on the analysis;
   collecting a current mobility and session state of the user device at a time of establishing the bearer;
   modifying the preliminary bearer selection based on the current mobility and session state of the user device such that the minimum overall signaling exchanges for the data transfer is minimized at the time of establishing the bearer to form a final bearer selection; and
   establishing the bearer based on the final bearer selection to send the command to the user device.

2. The method of claim 1, wherein preliminary bearer selection further comprises:
   selecting a packet data connection if the size of the data is big, the frequency of data transfer is short, or a high quality of service is requested;
   selecting a non-real-time store and forward mechanism if the size of the data is small, the frequency of data transfer is long, or a quality of service is not requested; and
   selecting a broadcast mechanism if the data transfer is not time or mission critical and the data associated with the command is sized to the broadcast mechanism's maximum data size.

3. The method of claim 1, wherein the components of the packet core are one of a serving general packet radio service (GPRS) support node (SGSN) or a serving gateway (S-GW), one of a gateway general packet radio service (GPRS) support node (GGSN) or a packet data network gateway (PDN-GW), a mobility management entity (MME), a home location register (HLR), and a policy and charging rule function (PCRF).

4. The method of claim 2, wherein the packet data connection is the data bearer through a packet data protocol (PDP) context, the non-real-time store and forward mechanism is a short message service (SMS), and the broadcast mechanism is a multimedia broadcast multicast service (MBMS).

5. The method of claim 1, wherein establishing the bearer further comprises:
   tracking the location of the user device periodically and storing the location over a period of time;
   predicting a target area where the user device could be at the time of establishing a bearer;
   sending a first paging request message only to a target area when the user device does not have a signaling connection to the network;
   sending a second paging request message to a whole area when the user device does not respond to the first paging request message; and
   establishing the bearer after the signaling connection is established via the first or second paging request message.

6. The method of claim 5, wherein the target area is one of an enhanced node B (eNB) area or a radio network controller (RNC) area and the whole area is one of a routing area or a tracking area.

7. A network element for processing network traffic of a packet network, the network element comprising:

a packet network interface unit to interface with an application server providing commands to a remote node, the commands being received by the packet network interface unit;

a radio access network interface unit to interface with the remote node via a radio access network;

a request database unit to store all the related information of received commands provided by the application server to the remote node, the related information including at least some of frequency, size of the data, quality of service, time criticality, mission criticality, and duration, and a first bearer selection via which the command is to be sent to the remote node;

a remote node mobility and session state unit to provide information of the remote node's mobility and session state and to provide the information of the location of the remote node periodically;

a policy decision unit to select a first bearer to send the command to the remote node in advance before sending the command, using information stored in the first request database unit and to select a final bearer at the time of sending the command using information provided by the remote node mobility and session state unit in conjunction with the first bearer selection; and a bearer establishing unit to exchange the signaling with the remote node in order to establish the bearer as the final bearer selected by the policy decision unit and to send the command to the remote node.

8. The network element of claim 7, wherein the radio network is comprised of at least one of a 3G radio access network, a high speed packet access (HSPA) network, a long term evolution (LTE) access network or a Wi-Fi access network.

9. The network element of claim 7, wherein the bearer establishing unit further:

establishes the bearer selected by the policy decision unit through an existing signaling connection if the remote node already has a signaling connection toward the radio access network;

sends a paging message to the remote node to request the remote node to create signaling connection toward the radio access network when the remote note does not have a signaling connection toward the radio access network;

selects a small target area to send a first paging message using location information of the remote node provided by the remote node mobility session state unit;

selects a whole area to send a second paging message when the remote node does not respond to the first paging message;

waits for the remote node to respond and create a signaling connection toward the radio access network; and establishes the bearer as the final bearer selected by the policy decision unit through a newly created signaling connection between the remote node and the radio access network.

10. A non-transitory machine-readable storage medium having instructions stored therein, which when executed by a machine, cause the machine to perform a method within a network element of a packet core to transfer data with a user device responsive to a command from a network application to the user device, the method comprising:

receiving the command from the network application;

analyzing the command for various criteria, including at least one of frequency, size of data, quality of service, time criticality, mission criticality, and duration;

making a preliminary selection of the bearer to require minimum overall signaling exchanges with minimum overall packet counts for the data transfer to deliver the command to the user device based on the analysis;

collecting a current mobility and session state of the user device at a time of establishing the bearer;

modifying the preliminary bearer selection based on the mobility and session current state of the user device such that the minimum overall signaling exchanges for the data transfer is minimized at the time of establishing the bearer to form a final bearer selection; and establishing the bearer based on the final bearer selection to send the command to the user device.

11. The non-transitory machine-readable storage medium of claim 10, wherein preliminary bearer selection further comprises:

selecting a packet data connection if the size of the data is big, the frequency of data transfer is short, or a high quality of service is requested;

selecting a non-real-time store and forward mechanism if the size of the data is small, the frequency of data transfer is long, or a quality of service is not requested; and selecting a broadcast mechanism if the data transfer is not time or mission critical and the data associated with the command is sized to the broadcast mechanism's maximum data size.

12. The non-transitory machine-readable storage medium of claim 10, wherein the components of the packet core are one of a serving general packet radio service (GPRS) support node (SGSN) or a serving gateway (S-GW), one of a gateway general packet radio service (GPRS) support node (GGSN) or a packet data network gateway (PDN-GW), a mobility management entity (MME), a home location register (HLR), and a policy and charging rule function (PCRF).

13. The non-transitory machine-readable storage medium of claim 11, wherein the packet data connection is the data bearer through a packet data protocol (PDP) context, the non-real-time store and forward mechanism is a short message service (SMS), and the broadcast mechanism is a multimedia broadcast multicast service (MBMS).

14. The non-transitory machine-readable storage medium of claim 10, wherein establishing the bearer further comprises:

tracking the location of the user device periodically and storing the location over a period of time;

predicting a target area where the user device could be at the time of establishing a bearer;

sending a first paging request message only to a target area when the user device does not have a signaling connection to the network;

sending a second paging request message to a whole area when the user device does not respond to the first paging request message; and establishing a bearer after the signaling connection is established via the first or second paging request message.

15. The non-transitory machine-readable storage medium of claim 14, wherein the target area is one of an enhanced node B (eNB) area or a radio network controller (RNC) area and the whole area is one of a routing area or a tracking area.

* * * * *